A. MACKEY.

CONNECTIONS TO METERS.

No. 9,869. Reissued Sept. 13, 1881.

WITNESSES

Geo. W. Haynes

E. S. Glatzmayer

INVENTOR

Alexander Mackey by his Attorneys

Brown & Brown

N. PETERS, Photo-Lithographer, Washington, D. C.

UNITED STATES PATENT OFFICE.

ALEXANDER MACKEY, OF NEW YORK, N. Y.

CONNECTION TO METERS.

SPECIFICATION forming part of Reissued Letters Patent No. 9,869, dated September 13, 1881.

Original No. 237,564, dated February 8, 1881. Application for reissue filed June 28, 1881.

*To all whom it may concern:*

Be it known that I, ALEXANDER MACKEY, a citizen of the United States, residing in the city of New York, in the State of New York, have invented certain new and useful Improvements relating to Connections to Meters, of which the following is a specification.

The invention is designed to apply to gas-meters and analogous meters generally. I will describe it as applied to a gas-meter.

The object is to better guard against the ordinary fraud perpetrated by consumers in disconnecting the service-pipe from the meter and making temporary connections to carry the fluid past the meter and using it in the house, manufactory, or other place to be supplied for a considerable time between the monthly inspections, thereby obtaining a large quantity of gas or other fluid which is not measured in the meter, and for which the consumer does not pay.

My invention consists in the combination, with the nut of a screw-coupling which is of polygonal form, of a lock or locking-piece composed of a collar or yoke surrounding and fitting said nut and a tail-piece or arm projecting from said collar and adapted to be sealed to one of the parts connected by said nut. This lock or locking-piece prevents the turning of the nut unless the seal is broken, which secures the tail-piece to one of the parts of the coupling which cannot be turned.

The invention also consists in a lock or locking-piece of the kind and adapted for use as above described, and also in another method of forming a lock, which I may employ as an auxiliary of the one first described to give additional security.

The accompanying drawings form a part of this specification.

Figure 1:
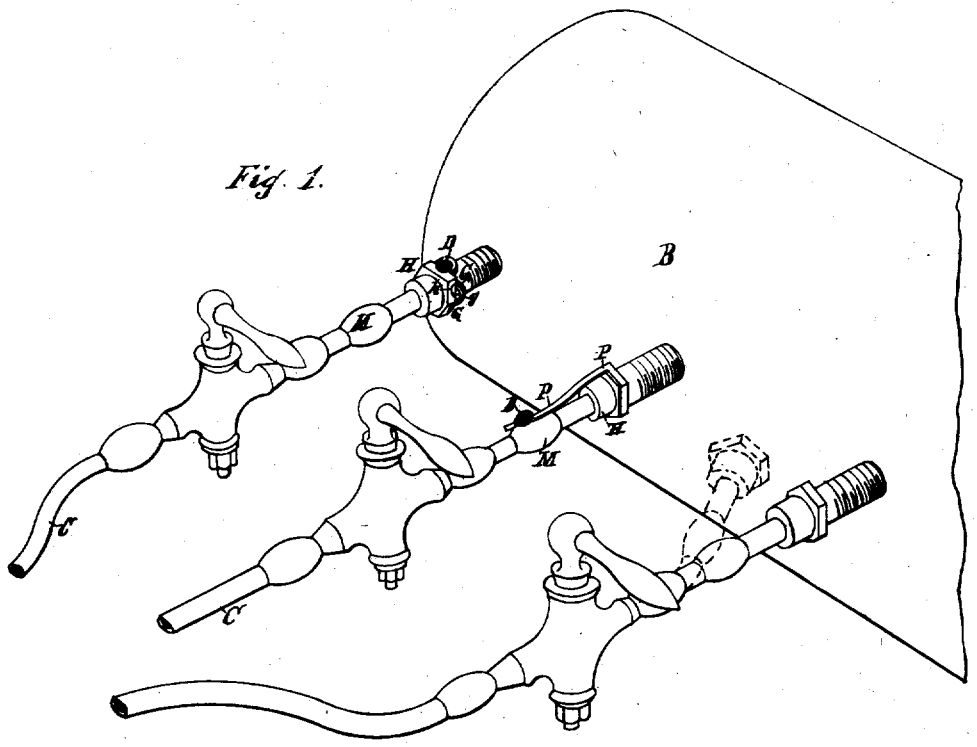
Figure 2:
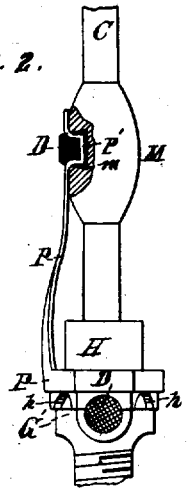
Figure 4:
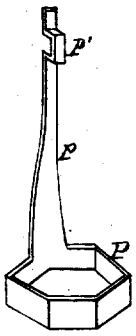
Figure 3:
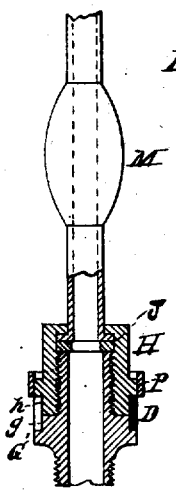

Figure 1 is a perspective view, showing a portion of a meter with three separate connections. It should be distinctly understood that I do not propose to attach three to the same meter. They are illustrations of separate connections, either of which can be employed. One—the one nearest the eye—does not contain the invention. I introduce it as an illustration. The dotted lines show the condition when the fraud is perpetrated which it is the object of my invention to prevent. The union has been disconnected from the service-pipe, bent sufficiently out of the proper line to allow a temporary connection (not represented) to be formed therewith, which leads over or past the meter and connects with the house-pipes, the gas thus flowing to the house being utilized without being registered by the meter. The other two connections in this figure, 1, show my invention applied to some extent so as to prevent such fraud. Fig. 2 is an elevation, and Fig. 3 a sectional view, showing the fullest form of my improvement. In this the two means of guarding against fraud shown in the two distant connections in Fig. 1 are combined. A meter, as ordinarily connected with screw-coupling connections or union-joints, is but small protection against fraud, because of the readiness with which the pipes may be disconnected from it and a temporary pipe be led past it, connecting the service with the house pipe. Fig. 4 is a perspective view of the locking-piece.

Similar letters of reference indicate corresponding parts in all the figures.

B is a portion of the meter, being the side of the meter in which the gas is received. It will be understood that the meter may be of any ordinary or suitable construction.

C is the service-pipe, conveying the gas from a street-main.

H is a union, constructed in any ordinary or suitable manner, to connect or disconnect the parts by being turned by any suitable wrench.

P is a locking-piece, having a hexagonal or suitably-formed yoke or collar adapted to match on the hexagonal or other suitably-formed periphery of the union H, and thus be held from turning. The locking-piece P is provided with an arm or tail-piece, *p*, extending out parallel, or nearly parallel, to the axis of the pipe C. At or near its outer end is an offset, *p'*, which extends a little distance toward the axis of the pipe C.

M is a joint, formed with soldering in the manner known as a "wiped" joint. There may be as many more such joints as the number of pieces or material or other conditions may require. My invention involves only the one nearest the screw-union.

I form a dovetailed recess, *m*, on the upper or other convenient side of the wiped joint M, and so proportion the parts that when the union H is secured and the joint is tightly made thereby, and the locking-piece applied so that its yoke P will embrace the hexagonal part of the union H, the arm *p* will extend therefrom to the wiped joint and the offset *p'* will stand right to enter the recess *m*. When the parts are thus in place a proper quantity of melted sealing-wax, D, is applied to fill the recesses *m* and something over, and upon this is imprinted the seal of the inspector.

The invention, so far as yet described, is shown in the middle connection in Fig. 1. This may be applied to old work.

In fitting up new work, or wherever the expense will be warranted, I employ, instead of the plain screw-union shown in the middle connection in Fig. 1, the specially-formed union G. (Shown in the farthest connection in Fig. 1 and in the additional Figs. 2 and 3.) This has a head or enlargement, G', formed as shown, of about equal diameter with the hexagonal screw-cap H of the union. At several points in the periphery of the enlargement G' and of the union H, I form recesses *g h* in the enlargement G' and in the union H. These are distributed at unequal distances, there being two more partial recesses in the union H than in the enlargement G'. It follows that in turning the screw-union H to complete a joint it is certain to come to rest with the recess at some point coinciding, or very nearly coinciding, with one of the recesses in the head G'. I apply in those recesses where they correspond a proper quantity of melted sealing-wax, and apply the seal of the inspector.

By having two more recesses in the union H than in the enlargement G', I am certain to have the recesses match together at two points in the periphery. I can secure the devices effectually by sealing only one. The arrangement to insure two avoids the inconvenience of ever having to effect the sealing on the under side.

The lock or locking-piece P *p* may, and generally will, be used alone; but additional security will be afforded by using it in connection with a coupling having the parts H G' provided with matching recesses. The locking-yoke P is engaged on the properly-formed periphery of the union H, and the offset *p'*, from its arm *p*, is entered in the recess *m* in the wiped joint M and secured with wax D with the impression of the seal, and in combination therewith I find the point on the upper side of the joint where the recesses in the parts G' and H coincide, and there apply the melted wax D and impress on it also the seal of the inspector. In order to violate this joint, both seals must be broken, and an additional security is thereby attained. In order to effect this combination, it is important to provide means for insuring a tightness of the union H, having one of its angles in line with recess *m* in the wiped joint, whether that position brings the coupling quite together, metal and metal, or not. To make a tight joint under these conditions I employ a considerable washer, J, of leather or other yielding material, in the position represented. (Shown in Fig. 3.) This makes a tight joint, with the union H screwed down a little more or a little less. With this provision I can turn the union H until it begins to bear gently on the soft washer J, and then, applying the locking-piece, observe whether the offset *p'* matches the hole *m*. If it does not, I shift the locking-piece around to a new position, so that its arm *p* corresponds with another angle of the union H, and turn the latter farther until its offset *p'* coincides with the recess, and then seal at the two points.

Modifications may be made in the detail. I can make the enlargement G' round instead of square or quarterfoil, as shown. I can provide a greater or less number of sides in the union H, or can make it star-shaped, or with teeth of greater or less fineness, always providing that the coupling-yoke P be adapted to be reliably engaged therewith. Instead of the offset *p'*, the arm *p* may be formed with a branch which will extend into the recess *m* and perform the same function.

What I claim as my invention, and desire to secure by Letters Patent, is—

1. The combination, with the nut of a screw-coupling, of a lock composed of a collar or yoke fitting said nut and a tail-piece or arm projecting from said collar and adapted to be sealed to one of the parts connected by said nut, substantially as specified.

2. A lock for a screw-coupling, composed of a collar or yoke adapted to fit the nut of such coupling and a tail-piece or arm projecting from said collar and adapted to be sealed to one of the parts connected by said nut, substantially as specified.

3. The meter B, nozzle G, union H, and locking-piece P *p*, having an offset or branch, *p'*, in combination with the wiped joint M, having a recess, *m*, and wax D, adapted to prevent the disconnection of the service-pipe C from the meter, as and for the purposes herein specified.

4. The enlargement G' and union H, having partial recesses *g h*, and wax D, in combination with the locking-piece P, having an arm, *p*, and offset or branch *p'*, and the wiped joint M, having a recess, *m*, and wax D, and with the meter B and service-pipe C, all substantially as and for the purposes herein specified.

ALEXR. MACKEY.

Witnesses:
FREDK. HAYNES,
ED GLATZMAYER.